(12) United States Patent
Zhong

(10) Patent No.: US 12,071,169 B2
(45) Date of Patent: Aug. 27, 2024

(54) SEAT MODULE AND TRANSPORTATION DEVICE

(71) Applicant: WONDERLAND SWITZERLAND AG, Steinhausen (CH)

(72) Inventor: Zhiren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 22 days.

(21) Appl. No.: 17/679,760

(22) Filed: Feb. 24, 2022

(65) Prior Publication Data
US 2022/0266888 A1 Aug. 25, 2022

(30) Foreign Application Priority Data
Feb. 25, 2021 (CN) .......................... 202110211555.0

(51) Int. Cl.
*B62B 9/10* (2006.01)
*B62B 7/06* (2006.01)
*B62B 7/08* (2006.01)

(52) U.S. Cl.
CPC .............. *B62B 9/102* (2013.01); *B62B 7/062* (2013.01); *B62B 7/08* (2013.01)

(58) Field of Classification Search
CPC .......... B62B 9/102; B62B 7/062; B62B 7/08; B62B 7/006; B62B 7/06; B62B 5/08; B62B 5/082; B62B 5/085
See application file for complete search history.

(56) References Cited

U.S. PATENT DOCUMENTS

| 6,270,111 B1 | 8/2001 | Hanson | |
|---|---|---|---|
| 2012/0032490 A1* | 2/2012 | Nowak | B62B 9/102 297/423.3 |
| 2013/0292987 A1* | 11/2013 | Doucette | B62B 7/123 297/423.3 |
| 2019/0291767 A1* | 9/2019 | Ansani | B62B 7/062 |
| 2019/0320814 A1* | 10/2019 | Zhong | A47D 1/002 |
| 2020/0010106 A1 | 1/2020 | Wang et al. | |
| 2020/0172142 A1* | 6/2020 | Young | B62B 7/142 |

(Continued)

FOREIGN PATENT DOCUMENTS

| CN | 101669737 A | 3/2010 |
|---|---|---|
| CN | 201587439 U | 9/2010 |

(Continued)

OTHER PUBLICATIONS

Translated copy of CN-201587439-U (Year: 2023).*
Translated copy of CN-201872781-U (Year: 2023).*

*Primary Examiner* — James A Shriver, II
*Assistant Examiner* — Ian Bryce Shelton
(74) *Attorney, Agent, or Firm* — HAUPTMAN HAM, LLP

(57) ABSTRACT

A transportation device includes a frame and a seat module. The seat module includes a seat body, a calf rest and an operating member. The seat body is pivotally connected to the frame and the seat body has a first engaging portion. The calf rest is pivotally connected to the seat body. The operating member has a press portion, an elastic portion, a pivotal portion and a second engaging portion. The operating member is pivotally connected to the calf rest by the pivotal portion. The elastic portion abuts against the calf rest. The second engaging portion engages with the first engaging portion, such that the calf rest is kept at a predetermined position.

20 Claims, 11 Drawing Sheets

(56) References Cited

U.S. PATENT DOCUMENTS

| | | | |
|---|---|---|---|
| 2020/0239058 A1* | 7/2020 | Zhang | B62B 9/104 |
| 2021/0403069 A1* | 12/2021 | Wang | B62B 7/08 |
| 2023/0042740 A1* | 2/2023 | Yuan | B62B 9/085 |

FOREIGN PATENT DOCUMENTS

| | | | | |
|---|---|---|---|---|
| CN | 201587439 U | * | 9/2010 | |
| CN | 201872781 U | * | 6/2011 | B62B 9/102 |
| CN | 202541620 U | * | 11/2012 | B62B 9/102 |
| CN | 204641853 U | * | 9/2015 | B62B 9/102 |
| CN | 204641853 U | | 9/2015 | |
| CN | 206265119 U | | 6/2017 | |
| CN | 209176767 U | | 7/2019 | |
| CN | 211196325 U | | 8/2020 | |
| CN | 112061218 A | * | 12/2020 | |
| CN | 212172329 U | | 12/2020 | |
| CN | 212172329 U | * | 12/2020 | |
| CN | 112238889 A | | 1/2021 | |
| EP | 3459817 A1 | * | 3/2019 | B62B 7/06 |
| GB | 2536526 A | | 9/2016 | |

\* cited by examiner

SEAT MODULE AND TRANSPORTATION DEVICE

FIELD

The application relates to a seat module and a transportation device.

BACKGROUND

A stroller is a tool used by parents to carry babies or children when they go shopping. At present, most of the strollers have a calf rest and the calf rest is usually disposed at a front end of a seat. Therefore, when the baby rides in the stroller, the legs of the baby can be supported by the calf rest, thereby making the baby more comfortable. In general, an angle of the calf rest may be adjusted by an adjusting structure. An operating member of the conventional adjusting structure is pivotally connected to the calf rest by a rivet and a spring is used to return the operating member. Since the operating member, the rivet and the spring are all independent components, the conventional adjusting structure is complicated, the cost is high, and the weight is heavy.

SUMMARY

A seat module includes a seat body, a calf rest and an operating member. The seat body has a first engaging portion. The calf rest is pivotally connected to the seat body. The operating member has a press portion, an elastic portion, a pivotal portion and a second engaging portion. The operating member is pivotally connected to the calf rest by the pivotal portion. The elastic portion abuts against the calf rest. The second engaging portion engages with the first engaging portion, such that the calf rest is kept at a predetermined position. When the press portion is pressed, the elastic portion is compressed to deform elastically and the second engaging portion disengages from the first engaging portion, such that the calf rest is able to rotate with respect to the seat body to adjust an angle of the calf rest. When the press portion is released, the elastic portion returns the operating member.

A transportation device includes a frame and a seat module. The seat module includes a seat body, a calf rest and an operating member. The seat body is pivotally connected to the frame. The seat body has a first engaging portion. The calf rest is pivotally connected to the seat body. The operating member has a press portion, an elastic portion, a pivotal portion and a second engaging portion. The operating member is pivotally connected to the calf rest by the pivotal portion. The elastic portion abuts against the calf rest. The second engaging portion engages with the first engaging portion, such that the calf rest is kept at a predetermined position. When the press portion is pressed, the elastic portion is compressed to deform elastically and the second engaging portion disengages from the first engaging portion, such that the calf rest is able to rotate with respect to the seat body to adjust an angle of the calf rest. When the press portion is released, the elastic portion returns the operating member.

DETAILED DESCRIPTION

Figure 1:
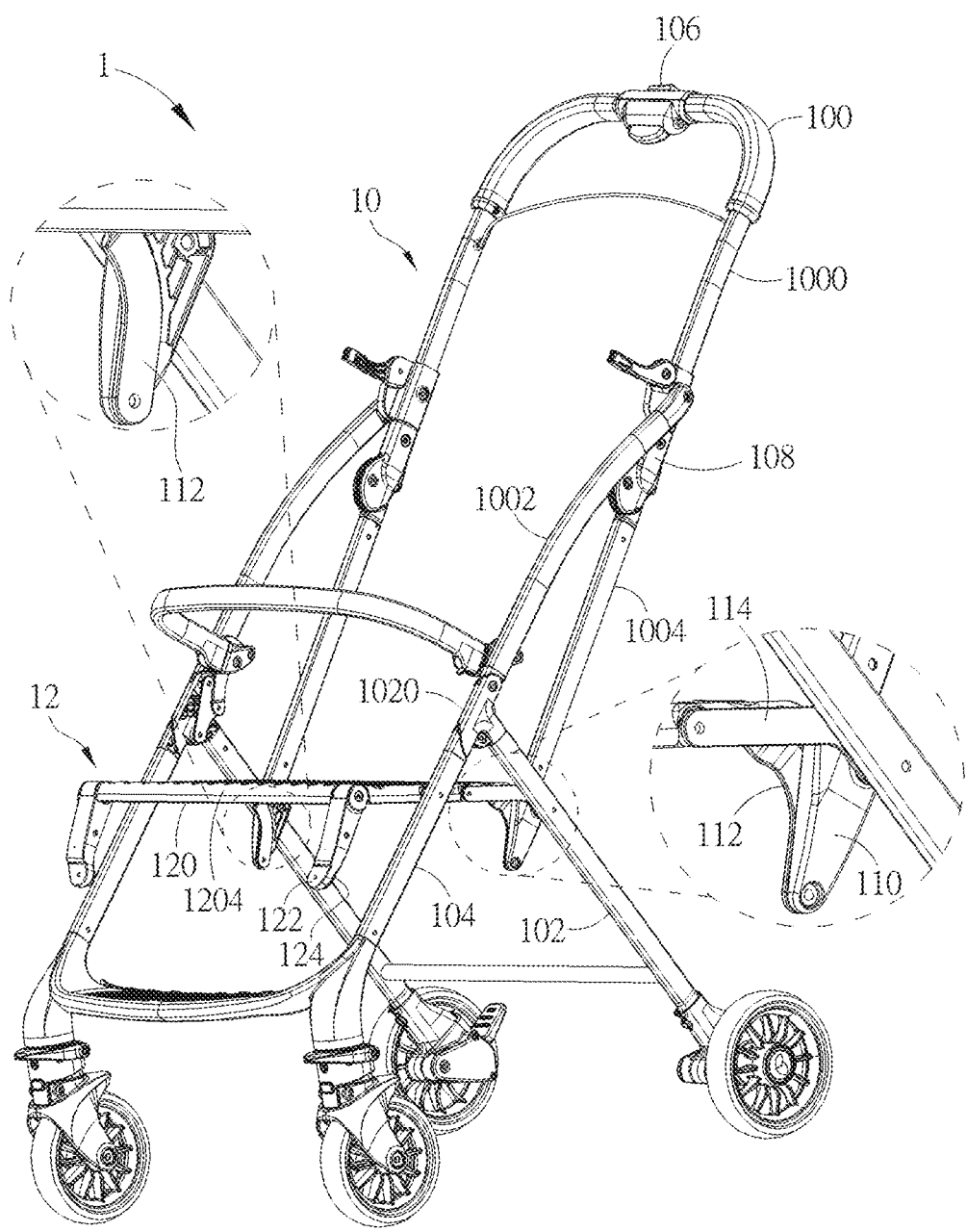
FIG. 1 is a perspective view illustrating a transportation device according to an embodiment of the application.
Figure 2:
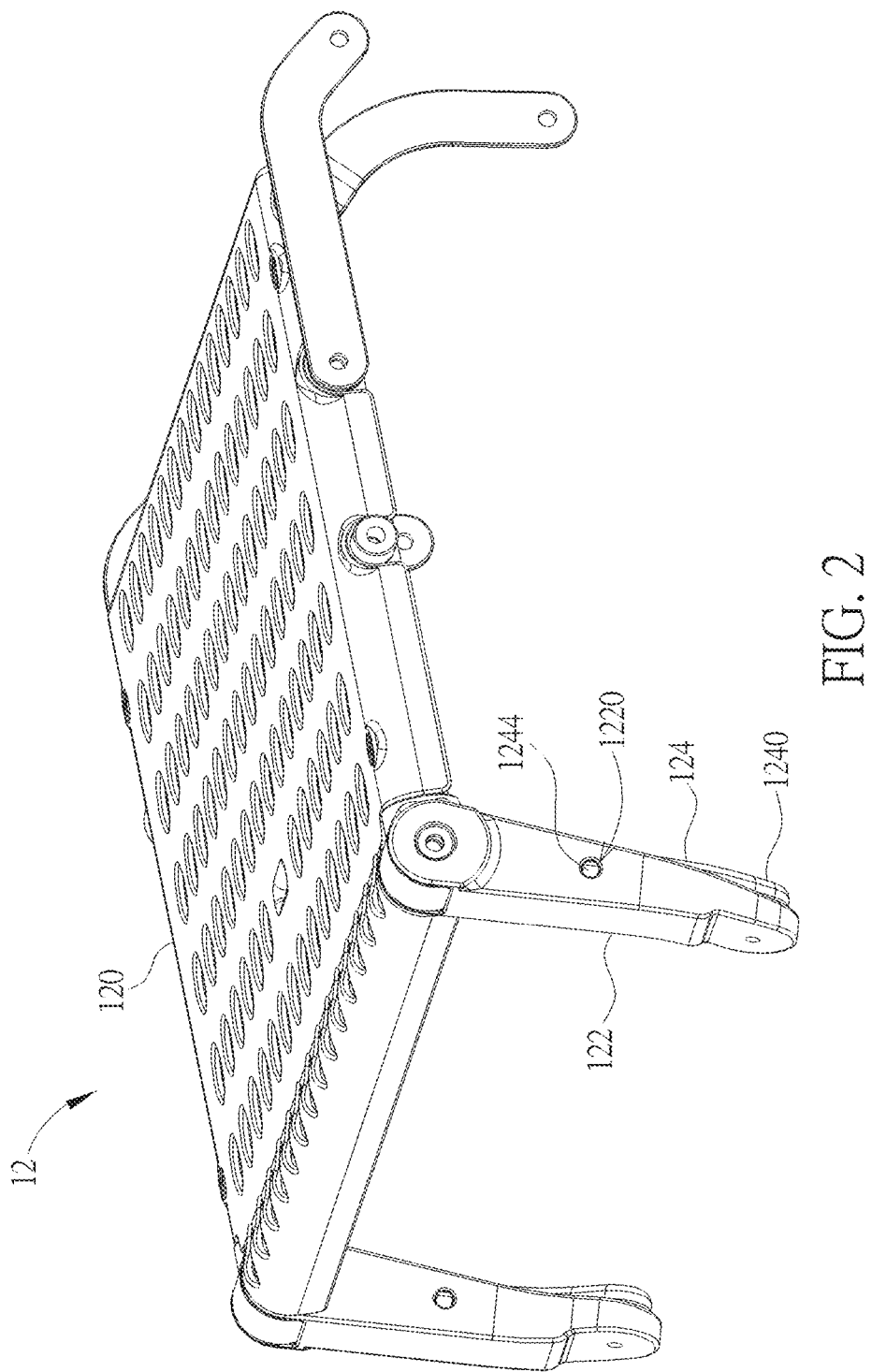
FIG. 2 is a perspective view illustrating a seat module shown in FIG. 1.
Figure 3:
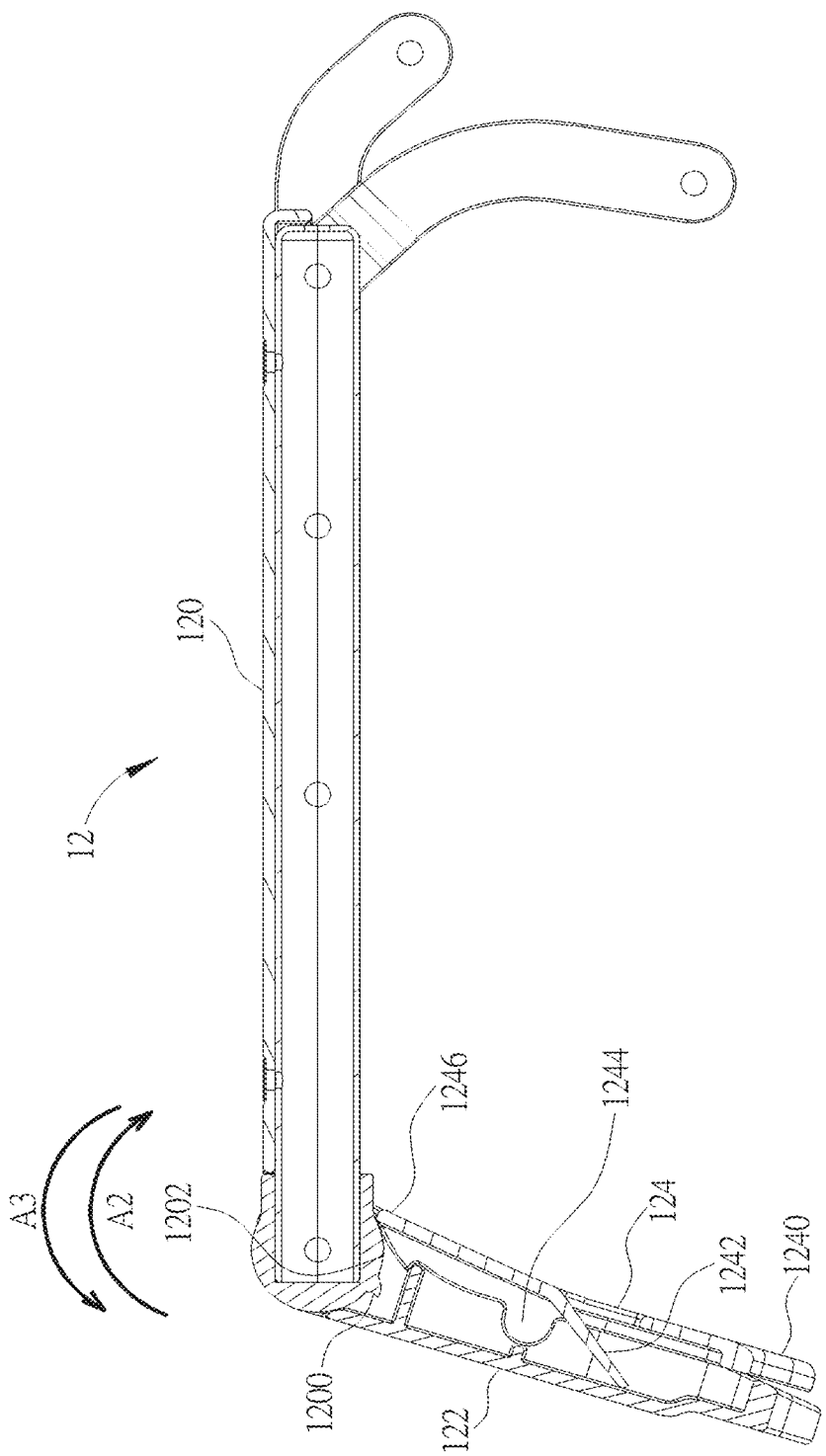
FIG. 3 is a sectional view illustrating the seat module shown in FIG. 2.
Figure 4:
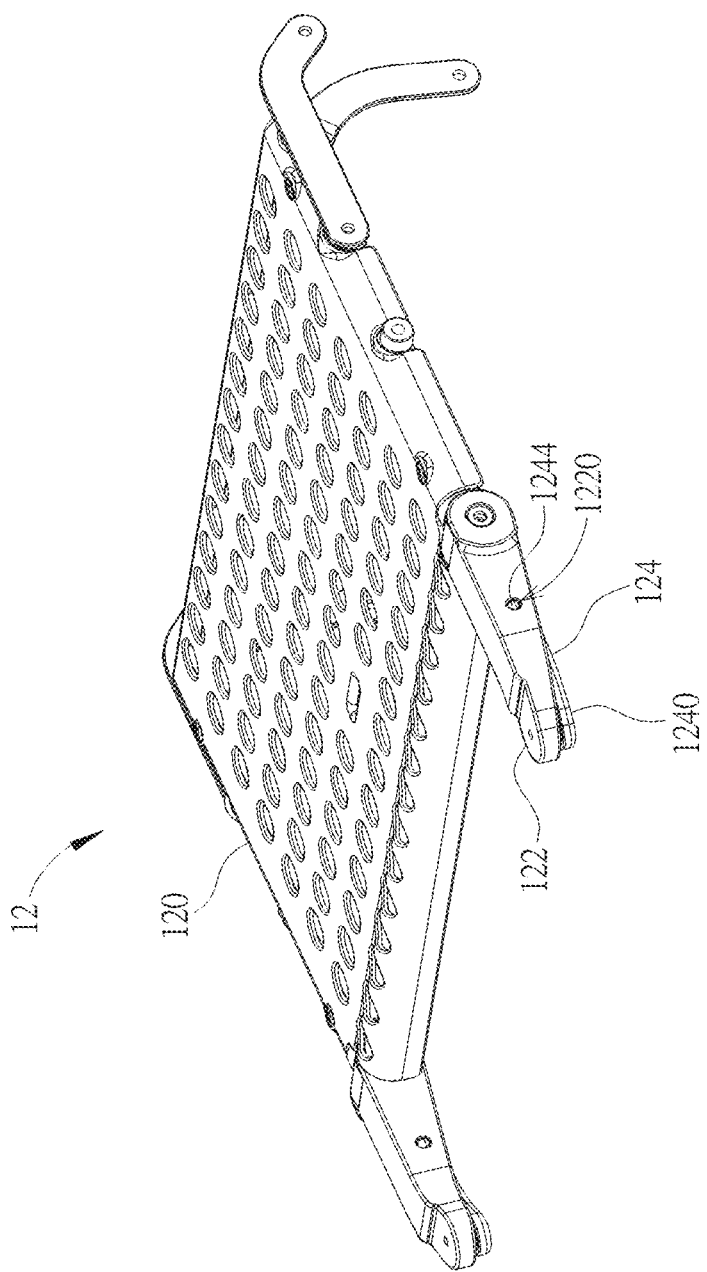
FIG. 4 is a perspective view illustrating a calf rest shown in FIG. 2 being adjusted to be horizontal with a seat body.
Figure 5:
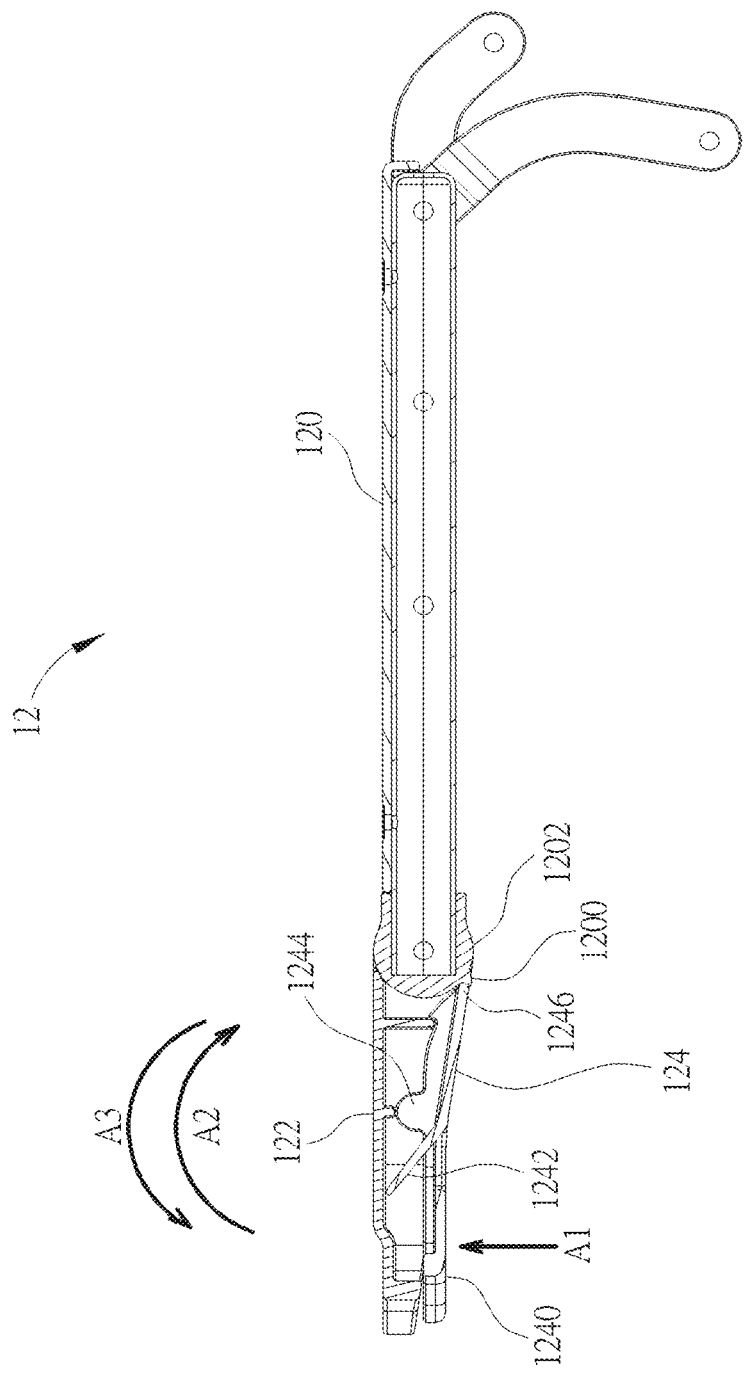
FIG. 5 is a sectional view illustrating the seat module shown in FIG. 4.
Figure 6:
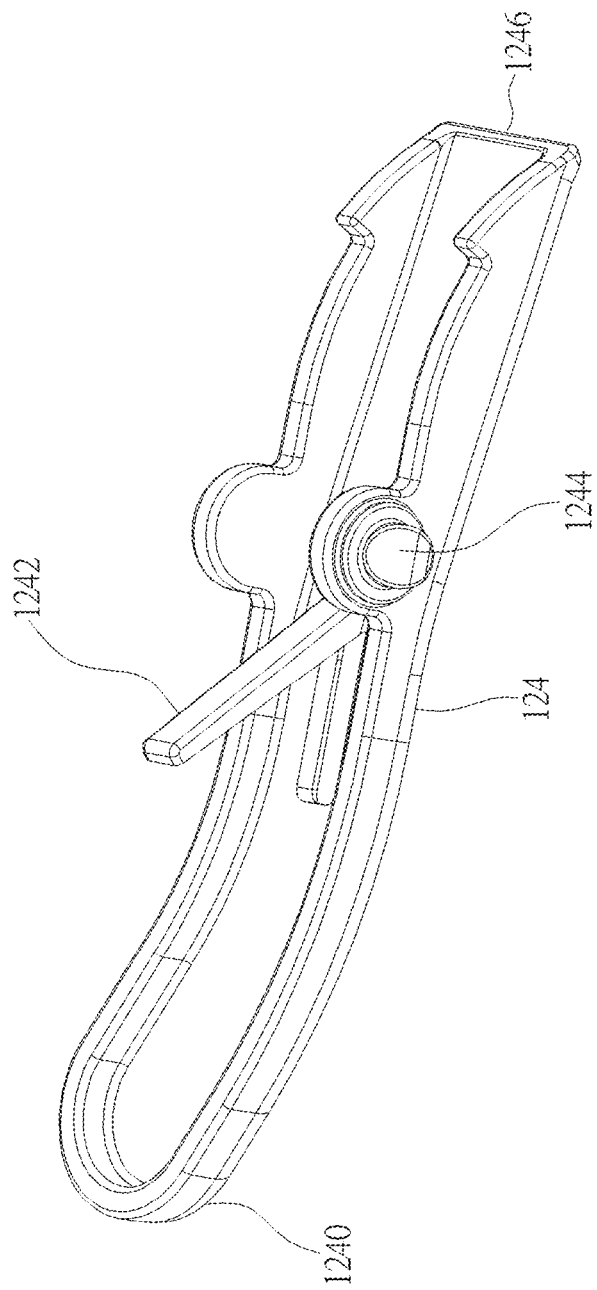
FIG. 6 is a perspective view illustrating an operating member shown in FIG. 5.
Figure 7:
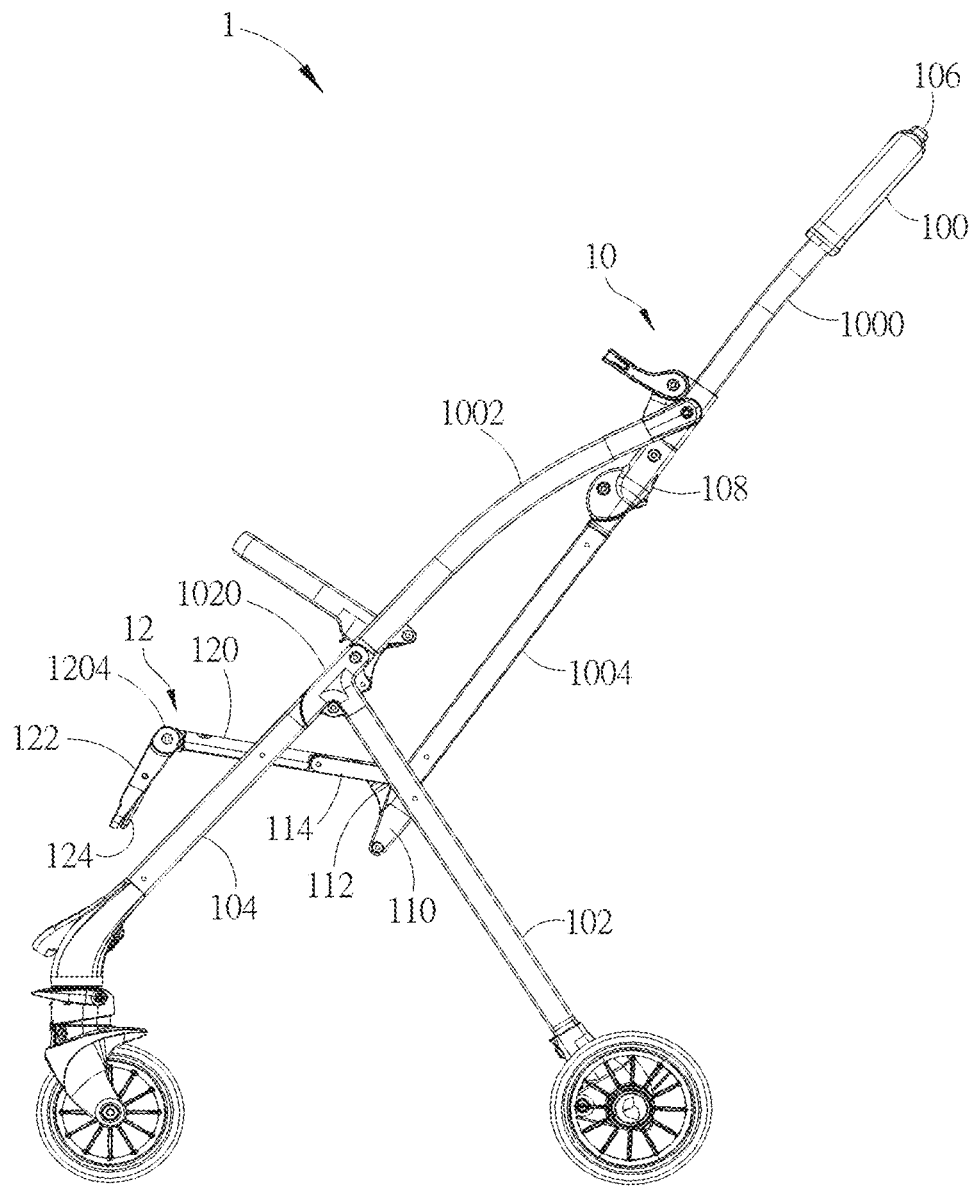
FIG. 7 is a side view illustrating the transportation device shown in FIG. 1.

Referring to FIGS. 1 to 6, FIG. 1 is a perspective view illustrating a transportation device 1 according to an embodiment of the application, FIG. 2 is a perspective view illustrating a seat module 12 shown in FIG. 1, FIG. 3 is a sectional view illustrating the seat module 12 shown in FIG. 2, FIG. 4 is a perspective view illustrating a calf rest 122 shown in FIG. 2 being adjusted to be horizontal with a seat body 120, FIG. 5 is a sectional view illustrating the seat module 12 shown in FIG. 4, and FIG. 6 is a perspective view illustrating an operating member 124 shown in FIG. 5.

As shown in FIG. 1, the transportation device 1 of the application includes a frame 10 and a seat module 12. The transportation device 1 may be a stroller or other device used for transportation. The seat module 12 is pivotally connected to the frame 10, such that the seat module 12 can be folded or unfolded with the frame 10. In this embodiment, the frame 10 may include a handle 100, a rear leg 102 and a front leg 104. The handle 100, the rear leg 102 and the front leg 104 are pivotally connected with each other, such that the handle 100, the rear leg 102 and the front leg 104 can rotate with respect to each other to be folded or unfolded. In this embodiment, the frame 10 may further include a folding operation member 106. The folding operation member 106 may be disposed on the handle 100. A user may operate the folding operation member 106 to fold the transportation device 1.

As shown in FIGS. 2 to 5, the seat module 12 includes a seat body 120, a calf rest 122 and an operating member 124. The seat body 120 is pivotally connected to the frame 10 and the seat body 120 has a first engaging portion 1200. In this embodiment, the first engaging portion 1200 may protrude from a lower edge 1202 (best seen in FIG. 3) of a front side of the seat body 120. The calf rest 122 is pivotally connected to the seat body 120. In this embodiment, there are two calf rests 122 pivotally connected to opposite sides of the front side of the seat body 120. The operating member 124 has a press portion 1240, an elastic portion 1242 (FIG. 3), a pivotal portion 1244 and a second engaging portion 1246 (FIG. 3). The operating member 124 is pivotally connected to the calf rest 122 by the pivotal portion 1244. In this embodiment, the pivotal portion 1244 may be a protrusion protruding outward (as shown in FIG. 6) and a middle portion of the calf rest 122 may have a pivotal hole 1220. The pivotal portion 1244 may be disposed in the pivotal hole 1220, such that the operating member 124 is pivotally connected to the calf rest 122.

As shown in FIGS. 3, 5 and 6, in this embodiment, the elastic portion 1242 may be an elastic sheet integrally formed on the operating member 124. When the operating member 124 is pivotally connected to the calf rest 122, the elastic portion 1242 abuts against an inner surface of the calf rest 122. In this embodiment, the elastic portion 1242 and the pivotal portion 1244 may be located between the press portion 1240 and the second engaging portion 1246, and the elastic portion 1242 may be close to the pivotal portion 1244.

As shown in FIG. 5, the second engaging portion 1246 of the operating member 124 engages with the first engaging portion 1200 of the seat body 120, such that the calf rest 122 is kept at a predetermined position. In this embodiment, when the calf rest 122 is kept at the predetermined position shown in FIG. 5, the calf rest 122 is horizontal with the seat body 120. When a user wants to adjust an angle of the calf rest 122, the user may press the press portion 1240 of the operating member 124 toward a direction of an arrow A1. When the press portion 1240 of the operating member 124 is pressed, the operating member 124 rotates around the pivotal portion 1244 toward a direction of an arrow A2. At this time, the elastic portion 1242 is compressed by the inner surface of the calf rest 122 to deform elastically and the second engaging portion 1246 disengages from the first engaging portion 1200, such that the calf rest 122 is able to rotate with respect to the seat body 120 toward a direction of an arrow A3 to adjust the angle of the calf rest 122. For example, when the second engaging portion 1246 disengages from the first engaging portion 1200, the user may rotate the calf rest 122 toward the direction of the arrow A3 to a position shown in FIG. 3. When the user wants to adjust the calf rest 122 from the position shown in FIG. 3 to the position shown in FIG. 5, the user may directly push the calf rest 122 toward the direction of the arrow A2.

As shown in FIGS. 3 and 5, the elastic portion 1242 of the operating member 124 abuts against the inner surface of the calf rest 122. Accordingly, when the press portion 1240 of the operating member 124 is pressed toward the direction of the arrow A1 shown in FIG. 5, the elastic portion 1242 is compressed by the inner surface of the calf rest 122 to deform elastically. When the press portion 1240 of the operating member 124 is released, an elastic force of the elastic portion 1240 returns the operating member 124 toward the direction of the arrow A3. Thus, when the calf rest 122 rotates with respect to the seat body 120, the elastic force of the elastic portion 1242 forces the second engaging portion 1246 of the operating member 124 to abut against the lower edge 1202 of the front side of the seat body 120. In this embodiment, the lower edge 1202 of the front side of the seat body 120 may be arc-shaped. Therefore, the second engaging portion 1246 of the operating member 124 may smoothly slide along the lower edge 1202 of the front side of the seat body 120, such that the calf rest 122 may smoothly rotate with respect to the seat body 120. Furthermore, when the calf rest 122 is located at the position shown in FIG. 5, the elastic force of the elastic portion 1242 will also keep a stable engagement between the second engaging portion 1246 of the operating member 124 and the first engaging portion 1200 of the seat body 120.

Figure 8:
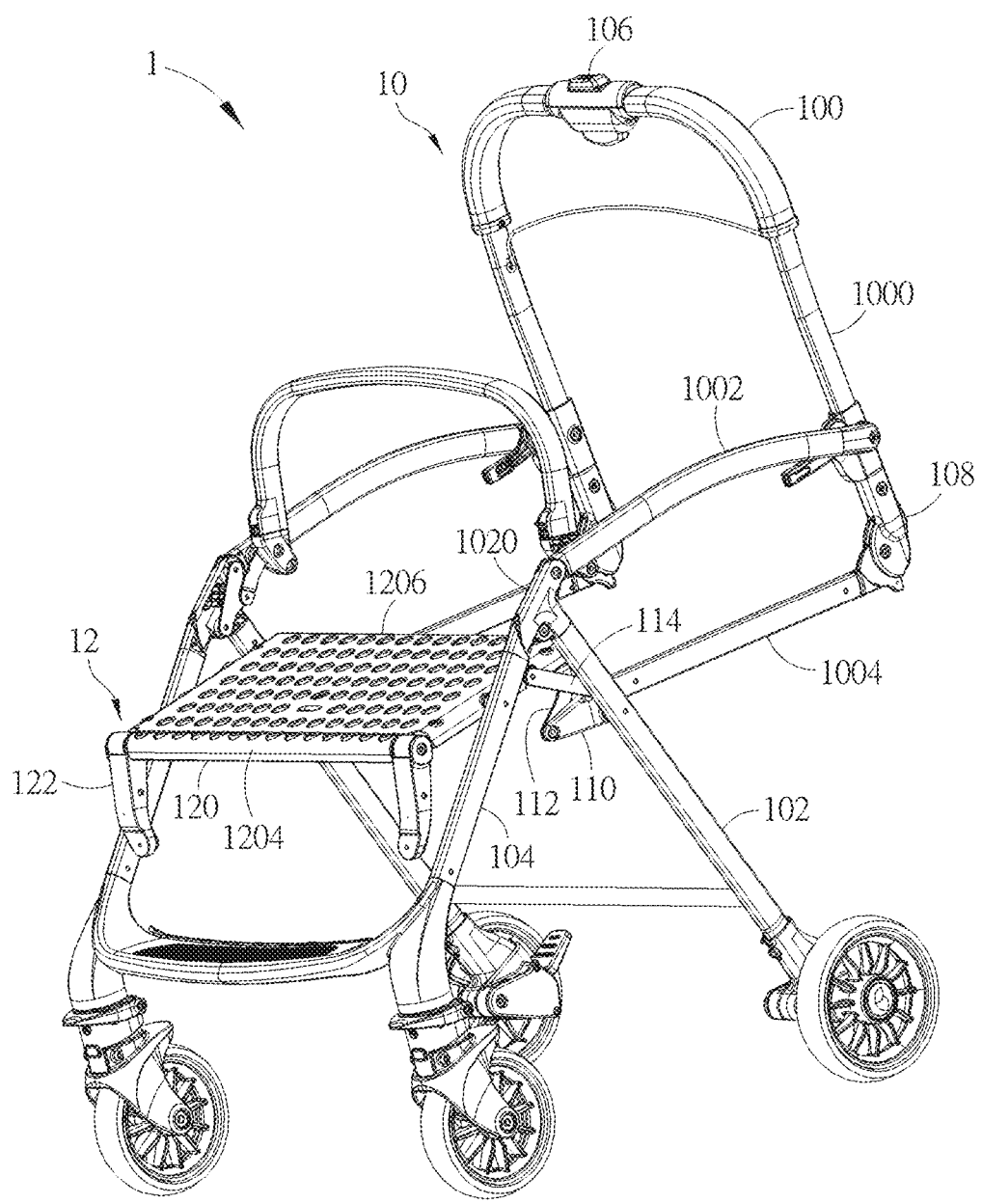
FIG. 8 is a perspective view illustrating the transportation device shown in FIG. 1 in a half folding state.
Figure 9:
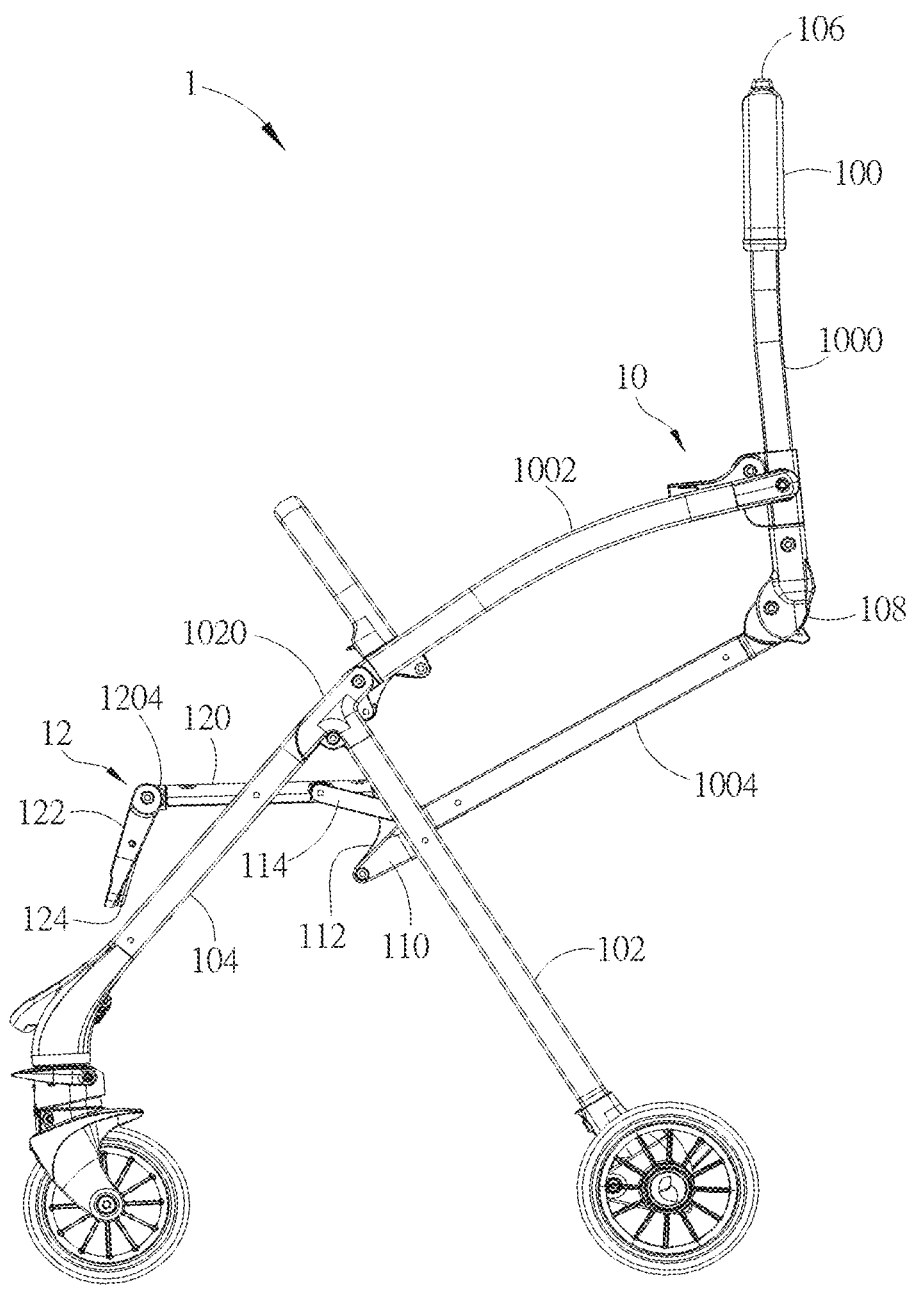
FIG. 9 is a side view illustrating the transportation device shown in FIG. 8.
Figure 10:
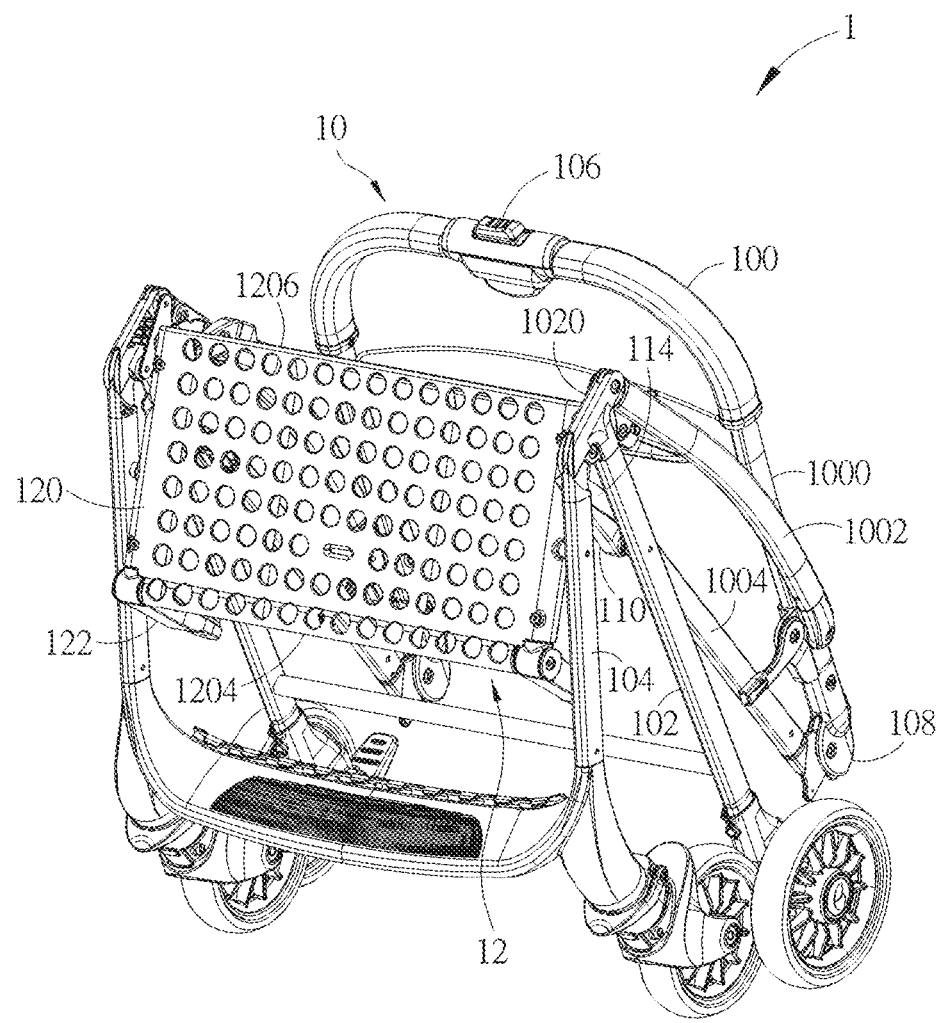
FIG. 10 is a perspective view illustrating the transportation device shown in FIG. 1 being folded.
Figure 11:
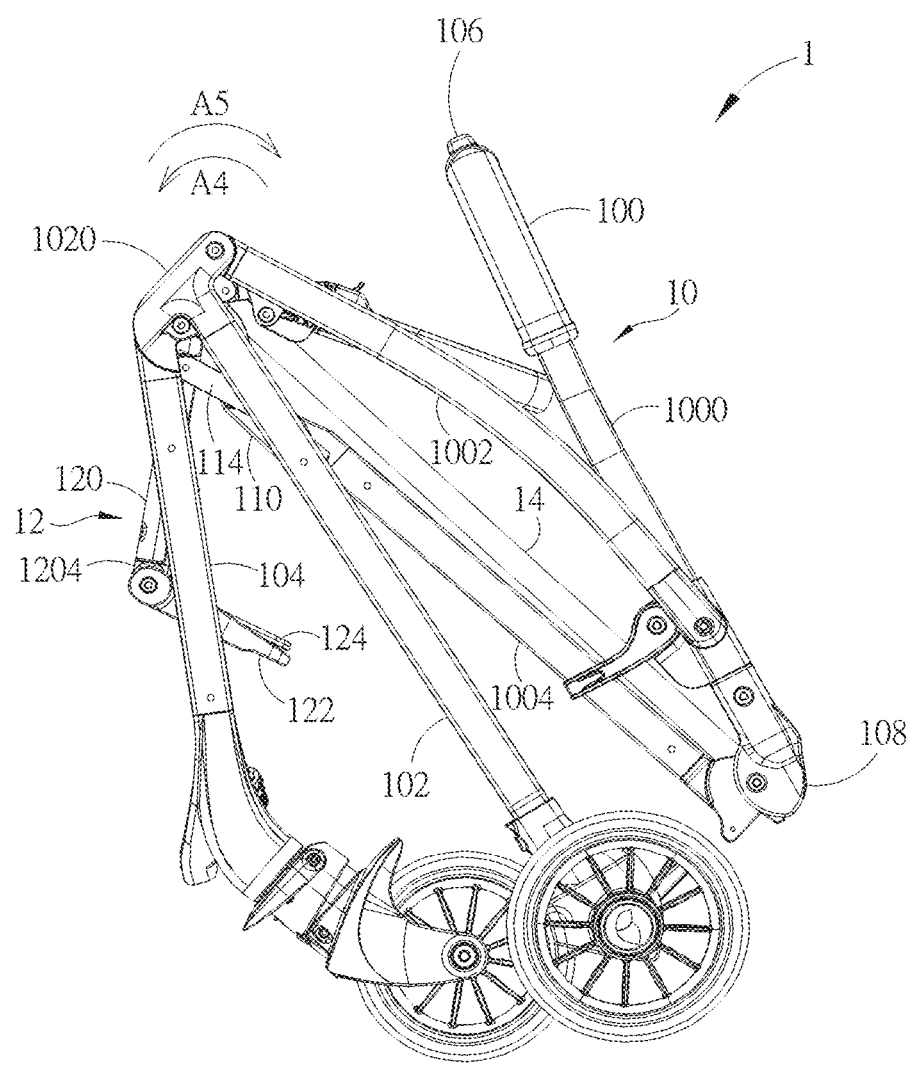
FIG. 11 is a side view illustrating the transportation device shown in FIG. 10.

Referring to FIGS. 7 to 11, FIG. 7 is a side view illustrating the transportation device 1 shown in FIG. 1, FIG. 8 is a perspective view illustrating the transportation device 1 shown in FIG. 1 in a half folding state, FIG. 9 is a side view illustrating the transportation device 1 shown in FIG. 8, FIG. 10 is a perspective view illustrating the transportation device 1 shown in FIG. 1 being folded, and FIG. 11 is a side view illustrating the transportation device 1 shown in FIG. 10. It should be noted that the structure of the transportation device 1 of the application is substantially symmetrical and the technical features of the application will be described by the structure of one side in the following.

As shown in FIGS. 1 and 7 to 11, in this embodiment, the handle 100 may include an upper handle 1000, a first lower handle 1002 and a second lower handle 1004. The first lower handle 1002 and the second lower handle 1004 are pivotally connected to the upper handle 1000, such that the upper handle 1000, the first lower handle 1002 and the second lower handle 1004 can rotate with respect to each other to be folded or unfolded. The folding operation member 106 may be disposed on the upper handle 1000. The transportation device 1 may further include a lock mechanism 108. A user may operate the folding operation member 106 to fold the transportation device 1. The lock mechanism 108 may be disposed at a pivotal joint between the upper handle 1000 and the second lower handle 1004, wherein the lock mechanism 108 is used to lock or unlock the upper handle 1000 and the second lower handle 1004.

As shown in FIGS. 1 and 7 to 11, the frame 10 may further include a fixing member 110, a first seat linkage member 112 and a second seat linkage member 114. The fixing member 110 is disposed at a rear side 1206 (FIG. 8) of the seat body 120 and connected to an end of the second lower handle 1004 of the handle 100. In this embodiment, the rear leg 102 may include a connecting member 1020. The front leg 104 and the first lower handle 1002 of the handle 100 are pivotally connected to opposite sides of the connecting member 1020 of the rear leg 102, such that the front leg 104 and the first lower handle 1002 of the handle 100 can rotate with respect to the rear leg 102 to be folded or unfolded. The seat body 120 is pivotally connected to the front leg 104. Opposite ends of the first seat linkage member 112 are pivotally connected to the seat body 120 and the fixing member 110. Opposite ends of the second seat linkage member 114 are pivotally connected to the seat body 120 and the rear leg 102. In this embodiment, the first seat linkage member 112 and the second seat linkage member 114 may be, but are not limited to, iron sheets or the like.

As shown in FIGS. 1, 8 and 10, the seat body 120 has a front side 1204 and a rear side 1206. The calf rest 122 is pivotally connected to the front side 1204 of the seat body 120, such that the calf rest 122 can rotate with respect to the seat body 120 to adjust an angle. Furthermore, the transportation device 1 may further include a backrest 14 (as shown in FIG. 11). In general, the backrest 14 is disposed at the rear side 1206 of the seat body 120. Thus, the rear side 1206 of the seat body 120 is a boundary between the seat body 120 and the backrest 14.

As shown in FIGS. 1 and 7 to 11, the handle 100, the rear leg 102 and the front leg 104 can be folded or unfolded with respect to each other to drive the seat body 120 to be folded or unfolded. For further illustration, when the handle 100, the rear leg 102 and the front leg 104 are folded with respect to each other, the fixing member 110 and the rear leg 102 will drive the seat body 120 to be folded or unfolded by the first seat linkage member 112 and the second seat linkage member 114, respectively. As shown in FIGS. 10 and 11, when the handle 100, the rear leg 102 and the front leg 104 are folded with respect to each other, the fixing member 110 and the rear leg 102 will drive the rear side 1206 of the seat body 120 to rotate toward a direction opposite to the ground (i.e., the direction of an arrow A4) by the first seat linkage member 112 and the second seat linkage member 114, respectively. Accordingly, after the seat body 120 is folded, the seat body 120 rotates downward in the direction of the arrow A4, such that the front side 1204 of the seat body 120 is lower than the rear side 1206 of the seat body 120. As mentioned in the above, the rear side 1206 of the seat body 120 is the boundary between the seat body 120 and the backrest 14. Therefore, in other words, after the seat body 120 is folded, the boundary between the seat body 120 and the backrest 14 moves to the most top position, such that the backrest 14 will not touch the ground after the transportation device 1 is folded. Thus, the length of the backrest 14 may increase according to practical requirements. As shown in FIGS. 10 and 11, after the transportation device 1 is folded, the seat body 120 rotates downward in the direction of the arrow A4, so as to reduce the height of the folded transportation device 1. Accordingly, it is beneficial for storing or transporting the transportation device 1. Furthermore, when the handle 100, the rear leg 102 and the front leg 104 are unfolded with respect to each other, the fixing member 110 and the rear leg 102 will drive the rear side 1206 of the seat body 120 to be positioned toward the ground (i.e., the direction of an arrow A5) by the first seat linkage member 112 and the second seat linkage member 114, respectively.

As mentioned in the above, the operating member of the seat module of the application is pivotally connected to the calf rest by its own pivotal portion, and the operating member is returned by its own elastic portion. Accordingly, the application does not need to install additional rivet and spring. The pivotal portion and the elastic portion can be integrally formed on the operating member. The structure is simple, the cost is low, and the weight is light. When the transportation device of the application is folded, the application utilizes the first seat linkage member and the second seat linkage member to drive the rear side of the seat body to rotate toward a direction opposite to the ground, such that the front side of the seat body is lower than the rear side of the seat body. In general, the rear side of the seat body is the boundary between the seat body and the backrest. Therefore, after the transportation device of the application is folded, the boundary between the seat body and the backrest will move to the most top position, such that the backrest will not touch the ground after the transportation device is folded. Thus, the length of the backrest may increase according to practical requirements. Furthermore, after the transportation device of the application is folded, the seat body rotates downward, so as to reduce the height of the folded transportation device. Accordingly, it is beneficial for storing or transporting the transportation device.

Those skilled in the art will readily observe that numerous modifications and alterations of the device and method may be made while retaining the teachings of the application. Accordingly, the above disclosure should be construed as limited only by the metes and bounds of the appended claims.

What is claimed is:

1. A seat module comprising:
a seat body having a first engaging portion at a first pivotal portion;
a calf rest pivotally connected to the seat body; and
an operating member having a press portion, an elastic portion, a second pivotal portion and a second engaging portion, the operating member being pivotally connected to the calf rest by the second pivotal portion, the elastic portion abutting against the calf rest;
wherein
the second engaging portion engages with the first engaging portion and the calf rest, such that the calf rest is kept at a predetermined position,
responsive to the press portion being pressed, the elastic portion is compressed to deform elastically and the second engaging portion disengages from the first engaging portion, such that the calf rest is able to rotate with respect to the seat body to adjust an angle of the calf rest,
responsive to the press portion being released, the elastic portion returns the operating member, and
the second pivotal portion is between the first pivotal portion and the elastic portion.

2. The seat module of claim 1, wherein the elastic portion is an elastic sheet integrally formed on the operating member.

3. The seat module of claim 1, wherein the first engaging portion protrudes from a lower edge of a front side of the seat body.

4. The seat module of claim 3, wherein responsive to the calf rest rotating with respect to the seat body, the second engaging portion abuts against the lower edge of the front side of the seat body.

5. The seat module of claim 3, wherein the lower edge of the front side of the seat body is arc-shaped.

6. The seat module of claim 1, wherein responsive to the calf rest being kept at the predetermined position, the calf rest is horizontal with the seat body.

7. The seat module of claim 1, wherein a middle portion of the calf rest has a pivotal hole and the second pivotal portion is disposed in the pivotal hole, such that the operating member is pivotally connected to the calf rest.

8. The seat module of claim 1, wherein the elastic portion and the second pivotal portion are located between the press portion and the second engaging portion.

9. The seat module of claim 1, wherein the elastic portion is close to the second pivotal portion.

10. A transportation device comprising:
a frame; and
a seat module comprising a seat body, a calf rest and an operating member, the seat body being pivotally connected to the frame, the seat body having a first engaging portion, the calf rest being pivotally connected to the seat body at a first pivotal portion, the operating member having a press portion, an elastic portion, a second pivotal portion and a second engaging portion, the operating member being pivotally connected to the calf rest by the second pivotal portion, the elastic portion abutting against the calf rest;
wherein
the second engaging portion engages with the first engaging portion and the calf rest, such that the calf rest is kept at a predetermined position,
responsive to the press portion being pressed, the elastic portion is compressed to deform elastically and the second engaging portion disengages from the first engaging portion, such that the calf rest is able to rotate with respect to the seat body to adjust an angle of the calf rest,
responsive to the press portion being released, the elastic portion returns the operating member, and
the second pivotal portion is between the first pivotal portion and the elastic portion.

11. The transportation device of claim 10, wherein the elastic portion is an elastic sheet integrally formed on the operating member.

12. The transportation device of claim 10, wherein the first engaging portion protrudes from a lower edge of a front side of the seat body.

13. The transportation device of claim 12, wherein responsive to the calf rest rotating with respect to the seat body, the second engaging portion abuts against the lower edge of the front side of the seat body.

14. The transportation device of claim 12, wherein the lower edge of the front side of the seat body is arc-shaped.

15. The transportation device of claim 10, wherein responsive to the calf rest being kept at the predetermined position, the calf rest is horizontal with the seat body.

16. The transportation device of claim 10, wherein a middle portion of the calf rest has a pivotal hole and the second pivotal portion is disposed in the pivotal hole, such that the operating member is pivotally connected to the calf rest.

17. The transportation device of claim 10, wherein the elastic portion and the second pivotal portion are located between the press portion and the second engaging portion.

18. The transportation device of claim 10, wherein the elastic portion is close to the second pivotal portion.

19. A transportation device comprising:
   a frame; and
   a seat module comprising a seat body, a calf rest and an operating member, the seat body being pivotally connected to the frame, the seat body having a first engaging portion, the calf rest being pivotally connected to the seat body, the operating member having a press portion, an elastic portion, a pivotal portion and a second engaging portion, the operating member being pivotally connected to the calf rest by the pivotal portion, the elastic portion abutting against the calf rest;
   wherein the second engaging portion engages with the first engaging portion, such that the calf rest is kept at a predetermined position; responsive to the press portion being pressed, the elastic portion is compressed to deform elastically and the second engaging portion disengages from the first engaging portion, such that the calf rest is able to rotate with respect to the seat body to adjust an angle of the calf rest; responsive to the press portion being released, the elastic portion returns the operating member, and
   wherein the frame comprises a handle, a rear leg, a front leg, a fixing member, a first seat linkage member and a second seat linkage member, the front leg is pivotally connected to the rear leg, the seat body is pivotally connected to the front leg, the fixing member is disposed at a rear side of the seat body and connected to an end of the handle, the first seat linkage member is pivotally connected to the seat body and the fixing member, the second seat linkage member is pivotally connected to the seat body and the rear leg; responsive to the handle, the rear leg and the front leg being folded with respect to each other, the fixing member and the rear leg drive the rear side of the seat body to rotate toward a direction opposite to ground by the first seat linkage member and the second seat linkage member respectively; responsive to the handle, the rear leg and the front leg being unfolded with respect to each other, the fixing member and the rear leg drive the rear side of the seat body to be positioned toward ground by the first seat linkage member and the second seat linkage member respectively.

20. The transportation device of claim 19, wherein after the seat body is folded, a front side of the seat body is lower than the rear side of the seat body.

* * * * *